United States Patent
Komeno et al.

[15] 3,673,173
[45] June 27, 1972

[54] PROCESS FOR PREPARATION OF $2\alpha,3\alpha$-EPITHIOSTEROID

[72] Inventors: Taichiro Komeno, Osaka; Hikozo Iwakura, Amagasaki, both of Japan

[73] Assignee: Shionogi & Co., Ltd., Osaka, Japan

[22] Filed: April 30, 1970

[21] Appl. No.: 33,522

[30] Foreign Application Priority Data

May 8, 1969 Japan.....................................44/35340

[52] U.S. Cl.....................260/239.5, 260/397.4, 260/397.45, 260/397.5, 260/999
[51] Int. Cl.........................................................C07c 167/36
[58] Field of Search................... Machine Searched Steroids

[56] References Cited

UNITED STATES PATENTS 3,290,294 12/1966 Komeno..............................260/239.5

*Primary Examiner*—Henry A. French
*Attorney*—Wenderoth, Lind & Ponack

[57] ABSTRACT

A process for the preparation of the hormonal $2\alpha,3\alpha$-epithio-$5\alpha$-steroid of estrane, androstane or the pregnane series which comprises reaction of the corresponding $\Delta^2$-$5\alpha$-steroid with thiocyanogen halide, followed by treatment of the products under basic conditions, some of the products thereof and pharmaceutical compositions containing the products thereof.

4 Claims, No Drawings

PROCESS FOR PREPARATION OF 2α,3α-EPITHIOSTEROID

The present invention relates to 2α,3α-epithiosteroids. More particularly, it relates to a novel process for the preparation of 2α,3α-epithiosteroids, products thereof and pharmaceutical preparations containing the products of this invention.

The novel process of the present invention for the preparation of 2α,3α-epithiosteroids comprises the reaction of a thiocyanogen halide with a Δ²-5α-steroid of the estrane, androstane or pregnane series to afford (2 or 3)α-thiocyanato-(3 or 2)β-halo-5α-sterOids or its derivatives, followed by treatment of the product under basic conditions.

The known process for preparation of 2α,3α-epithio-5α-steroids involves a process starting from a 3-oxo-5α-steroid compound prepared from the corresponding 3-hydroxy-compound by oxidation, in which the starting material is halogenated and reduced to its 3-oxo group to give a halohydrin, and the latter is treated with a base to afford an epoxide, the epoxide is then treated with thiocyanic acid to give thiocyanatohydrin, which is treated with a base to afford the desired compound; and a process starting from a 3-oxo-5α-steroid compound, in which the starting material is halogenated, the introduced halogen atom is replaced with thiocyanato group, the oxo group is reduced to give thiocyanatohydrin, and the latter is treated with a base to afford desired compound. Total yields of both of the processes are lower because of e.g. multiplied unit processes, possible side reaction causing lower yield such as halogenation at undesired position, and so on in the former process, and e.g. lower yield of replacement reaction of halogen atoms with thiocyanato group and undesired halogenation in the halogenation step in the latter process.

The reaction of the present invention is represented e.g. by the following reaction scheme for ring A of the steroid nucleus:

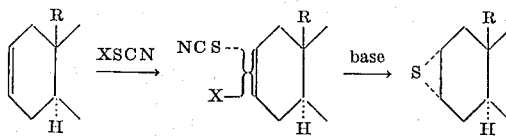

wherein X is a halogen atom and R is a methyl group or hydrogen atom. In the reaction of the first step, as the thiocyanato cation attacks the double bond mainly from α-side, the thiocyanato group of the products occupies mainly at α-positions, and as the result, the products of the second step have mainly epithio groups of α-configuration.

The process of the present invention comprises as the first step reacting a thiocyanogen halide on the Δ²-steroid; and as the second step reacting base on the products of the first step.

As for the starting materials of the present invention, the Δ²-steroid of estrane, androstane or pregnane series, preparable for example by dehydration of the corresponding 3-hydroxy compounds, are utilized. They can possess a conventional inert substituent, e.g. a lower hydrocarbon group hydroxyl group, acyloxy group, alkoxy group, oxo group, alkylenedioxy group, halogen atom, unsaturated bond, nitrogen or sulfur functions and the like at any position in the steroid nucleus in addition to the double bond at position 2(3). Representatives of these materials are as follows 5α-androst-2-en-17β-ol,
17α-methyl-5α-androst-2-en-17β-ol,
17α-ethyl-5α-androst-2-en-17β-ol,
17α-propyl-5α-androst-2-en-17β-ol,
17α-ethynyl-5α-androst-2-en-17β-ol,
1α-methyl-5α-androst-2-en-17β-ol,
2-methyl-5α-androst-2-en-17β-ol,
3-methyl-5α-androst-2-en-17β-ol,
7α-methyl-5α-androst-2-en-17β-ol,
8β-methyl-5α-androst-2-en-17β-ol,
18-methyl-5α-androst-2-en-17β-ol,
7α17α-dimethyl-5α-androst-2-en-17β-ol,
5α-androst-2-ene-6β,17β-diol,
5α-androst-2-ene-7α,17β-diol,
17α-methyl-5α-androst-2-ene-6β,17β-diol,
17α-methyl-5α-androst-2-ene-7α,17β-diol,
5α-androsta-2,6(7)-dien-17β-ol,
5α-androsta-2,9(11)-dien-17β-ol,
17-methylene-5α-androst-2-en-17β-ol,
17α-methyl-5α-androsta-2,6(7)-dien-17β-ol,
17α-methyl-5α-androsta-2,9(11)-dien-17β-ol,
17α-ethyl-5α-androsta-2,9(11)-dien-17β-ol,
5α-estr-2-en-17β-ol, 17α-methyl-5α-estr-2-ene-17β-ol,
5α-pregn-2-en-20-one,
9α-fluoro-5α-pregn-2-ene-20-one,
17α-hydroxy-5α-pregn-2-en-20-one,
16α,17α-dihydroxy-5α-pregn-2-en-20-one,
17α-hydroxy-5α-pregn-2-ene-11,20-dione,
17α,21-dihydroxy-5α-pregn-2-en-20-one,
9α-fluoro-17α,21-dihydroxy-5α-pregn-2-en-20-one,
6β-fluoro-17α,21-dihydroxy-5α-pregn-2-ene-20-one,
6β-methyl-9α-fluoro-17α,21-dihydroxy-5α-pregn-2-en-20-one, and their esters, ethers oxygenated compounds especially in the case of androstan-17β-ol derivatives, the corresponding 17-oxo derivatives.

The ester group in the starting materials may be an organic or inorganic acylate such as alkanoate, e.g. acetate, propionate, enanthate, dodecanoate, etc.; alicyclic acylates, e.g. cyclopropylcarboxylate, adamantoate, etc.; unsaturated acylate, e.g. ethynylacetate, undecenoate, etc.; aromatic acylate, e.g. benzoate, substituted benzoate, etc.; substituted alkanoates, e.g. phenoxyacetate, chloroacetate, phenylpropionate, etc.; sulfonates, e.g. methanesulfonate, ethanesulfonate, benzenesulfonate, toluene-p-sulfonate, etc.; or inorganic acylates, e.g. carbonate, phosphate, sulfate, etc.; and ethers or acetals may be ether, e.g. 1-alkoxycycloalkyl ether, cycloalkenyl ether, tetrahydropyranyl ether, methyl ether, etc.; or acetal, e.g. dimethyl ketal, methylene ketal, ethylene ketal, etc. The reagent of the process of the present invention, a thiocyanogen halide is thiocyanogen chloride, thiocyanogen bromide or the like. These are conveniently prepared by the methods described e.g. in Journal of the Chemical Society, page 318, 1960, for example by the reaction of alkali thiocyanate and halogen or by the reaction of thiocyanogen and halogen.

The first step of the process of the present invention is carried out by reacting a thiocyanogen halide on the said starting material. The reaction of this step is carried out by bringing the starting material into contact with the thiocyanogen halide. This reaction weakly exothermic and may be carried out at room temperature or at a lower temperature. Five to a hundred mole equivalents of the reagent give preferable results. The reaction medium can be stirred or kept under inert gas. The reaction can be carried out in a solvent. The solvents used in this step may be hydrocarbons, e.g. petroleum ether, heptane, toluene, benzene, etc.; halogenated hydrocarbons, e.g. carbon tetrachloride, chloroform, methylene chloride, dichloroethane, chlorobenzene, etc.; ethers, e.g. diethyl ether, tetrahydrofuran, dioxane, etc.; esters, e.g. ethyl acetate, butyl acetate, etc.; alcohols, e.g. menthanol, ethanol, butanol, etc.; organic acids, e.g. acetic acid, propionic acid, etc.; organic bases, e.g. pyridine, collidine, etc.; and other solvents, e.g. dimethylformamide, nitrobenzene, acetonitril, water, etc., or mixtures thereof. Sometimes preferable results are obtained when the reaction medium is anhydrous. When the reaction of this step was carried out in acetic acid, the reaction proceeded very rapidly. After 30 minutes, the mixture began to show slow secondary changes and a shorter reaction period was preferable. When the solvent can form an anion, e.g. acetate ion, the anion from the solvent instead of reacting with the halogen ion, reacts with the thiocyanato carbonium ion to some extent and affords products such as acetylated thiocyanatohydrins which may be converted to the same 2α,3α-epithio compound by reaction of the second step. If desired, the products of the first step are subjected to the reaction of the second step without purification or separation of individual products. This procedure saves loss of products and troubles caused by isolation and results in higher total yield. The reaction of the first step is an addition reaction forming mainly a trans-diaxial substituent. Under some conditions, a transdiequatorial substituent is formed to some extent. Both of the trans-diaxial and diequatorial compounds of the products of the first step give the same product by the process of the second step.

In the second step of the process of the present invention, the products of the first step are treated under basic conditions. The basic condition for this purpose is obtained with a base ranging from weak base, e.g. alumina, to a strong base. Representatives of these involve a weak base, e.g. alumina, alkali metal hydrogen carbonate, alkaline earth metal carbonate, ammonia, alkylamines, and a strong base, e.g. alkali metal carbonates, alkali metal hydroxide, tert-ammonium hydroxide, etc., or ion-exchange resins of various basicity. They are utilized in solvents, e.g. hydrocarbons, halogenated hydrocarbons, ethers, esters, alcohols, organic bases and other organic solvents, water etc., or their mixtures. Generally, the reaction of this step is carried out at room temperature or at elevated temperature.

The products of the first step and the second step are isolated and purified in conventional manner, e.g. by dilution, filtration, extraction, washing, drying, concentration, recrystallization, chromatography, absorption, elution, etc., or combinations thereof. If required, the products of the first step may be subjected to reaction of the second step without further purification. Each of them can be esterified, ketalated or etherified for convenience of purification and utilization. Under some reaction conditions, hydrolysis of some groups such as esters, ketals, ethers or the like occurs. The compounds of desired structure can be recovered by subjecting the products to the above reactions.

The product of the process of the present invention is the $2\alpha,3\alpha$-epithio-$5\alpha$-steroid of the estrane, androstane or pregnane series. These compounds can possess a conventional substituent, e.g. lower hydrocarbon group, hydroxyl group, acyloxy group, alkoxy group, oxo group, alkylenedioxy group, halogen atom, unsaturated bond, nitrogen or sulfur functions and the like at any position on the steroid nucleus in addition to the $2\alpha,3\alpha$-epithio group. Representative of these compounds are:

$2\alpha,3\alpha$-epithio-$5\alpha$-androstan-$17\beta$-ol,
$2\alpha,3\alpha$-epithio-$17\alpha$-methyl-$5\alpha$-androstan-$17\beta$-ol,
$2\alpha,3\alpha$-epithio-$17\alpha$-ethyl-$5\alpha$-androstan-$17\beta$-ol,
$2\alpha,3\alpha$-epithio-$17\alpha$-propyl-$5\alpha$-androstan-$17\beta$-ol,
$2\alpha,3\alpha$-epithio-$17\alpha$-ethynyl-$5\alpha$-androstan-$17\beta$-ol,
$2\alpha,3\alpha$-epithio-$1\alpha$-methyl-$5\alpha$-androstan-$17\beta$-ol,
$2\alpha,3\alpha$-epithio-$2\beta$-methyl-$5\alpha$-androstan-$17\beta$-ol,
$2\alpha,3\alpha$-epithio-$3\beta$-methyl-$5\alpha$-androstan-$17\beta$-ol,
$2\alpha,3\alpha$-epithio-$7\alpha$-methyl-$5\alpha$-androstan-$17\beta$-ol,
$2\alpha,3\alpha$-epithio-$8\beta$-methyl-$5\alpha$-androstan-$17\beta$-ol,
$2\alpha,3\alpha$-epithio-$18$-methyl-$5\alpha$-androstan-$17\beta$-ol,
$2\alpha,3\alpha$-epithio-$7\alpha,17\alpha$-dimethyl-$5\alpha$-androstan-$17\beta$-ol,
$2\alpha,3\alpha$-epithio-$5\alpha$-androstane-$6\beta,17\beta$-diol,
$2\alpha,3\alpha$-epithio-$5\alpha$-androstane-$7\alpha,17\beta$-diol,
$2\alpha,3\alpha$-epithio-$17\alpha$-methyl-$5\alpha$-androstane-$6\beta,17\beta$-diol,
$2\alpha,3\alpha$-epithio-$17\alpha$-methyl-$5\alpha$-androstane-$7\alpha,17\beta$-diol,
$2\alpha,3\alpha$-epithio-$5\alpha$-androst-$6(7)$-en-$17\beta$-ol,
$2\alpha,3\alpha$-epithio-$5\alpha$-androst-$9(11)$-en-$17\beta$-ol,
$2\alpha,3\alpha$-epithio-$17$-methylene-$5\alpha$-androstan-$17\beta$-ol,
$2\alpha,3\alpha$-epithio-$17\alpha$-methyl-$5\alpha$-androst-$6(7)$-en-$17\beta$-ol,
$2\alpha,3\alpha$-epithio-$17\alpha$-methyl-$5\alpha$-androst-$9(11)$-ene-$17\beta$-ol,
$2\alpha,3\alpha$-epithio-$17\alpha$-ethyl-$5\alpha$-androst-$9(11)$-en-$17\beta$-ol,
$2\alpha,3\alpha$-epithio-$5\alpha$-estran-$17\beta$-ol,
$2\alpha,3\alpha$-epithio-$17\alpha$-methyl-$5\alpha$-estran-$17\beta$-ol,
$2\alpha,3\alpha$-epithio-$5\alpha$-pregnan-$20$-one,
$2\alpha,3\alpha$-epithio-$9\alpha$-fluoro-$5\alpha$-pregnan-$20$-one,
$2\alpha,3\alpha$-epithio-$17\alpha$-hydroxy-$5\alpha$-pregnan-$20$-one,
$2\alpha,3\alpha$-epithio-$16\alpha,17\alpha$-dihydroxy-$5\alpha$-pregnan-$20$-one,
$2\alpha,3\alpha$-epithio-$17\alpha$-hydroxy-$5\alpha$-pregneane-$11,20$-dione,
$2\alpha,3\alpha$-epithio-$17\alpha,21$-dihydroxy-$5\alpha$-pregnan-$20$-one,
$2\alpha,3\alpha$-epithio-$9\alpha$-fluoro-$17\alpha,21$-dihydroxy-$5\alpha$-pregnan-$20$-one,
$2\alpha,3\alpha$-epithio-$6\beta$-fluoro-$17\alpha,21$-dihydroxy-$5\alpha$-pregnan-$20$-one,
$2\alpha,3\alpha$-epithio-$6\beta$-methyl-$9\alpha$-fluoro-$17\alpha,21$-dihydroxy-$5\alpha$-pregnan-$20$-one, and their esters, ethers, oxygenated compounds especially in the case of androstan-$17\beta$-ol derivatives, the corresponding $17$-oxo derivatives.

The esters, ethers, acetals and the like of the products of this invention may be those cited in the explanation of the starting materials of the present invention.

The compounds prepared by the process of the present invention are useful as the active ingredient in medicine of pharmaceutical, veterinary or poultry use for the medical activities such as estrogenic activity, anti-estrogenic activity, myogenic activity, androgenic activity, antiinflammatory activity, antifertility effect, anti-microbial activity, pituitary gonadotrophin inhibiting activity, wound healing activity, lipid shifting activity, uterotropic activity, anti-uterotropic activity, anti-mammary growth activity, anti-progestational activity, diuretic activity, and related activities. Further, the process of the present invention is superior to the known methods from the view point of the overall yield from the same starting material. Moreover, the process of the present invention is three steps from easily available 3-hydroxy compounds, in contrast to more than six steps of the known methods. Hence, the process of the present invention is of practical value.

The novel compounds of the present invention are the compounds selected from the group consisting of:
$2\alpha,3\alpha$-epithio-$5\alpha$-androstane-$6\beta,17\beta$-diol,
$2\alpha,3\alpha$-epithio-$5\alpha$-androstane-$7\alpha,17\beta$-diol,
$2\alpha,3\alpha$-epithio-$5\alpha$-androst-$9(11)$-en-$17\beta$-ol and their $17\alpha$-hydrocarbon substituted compounds, and
$2\alpha,3\alpha$-epithio-$17\alpha$-hydroxy-$5\alpha$-pregnane-$11,20$-dione, and esters thereof.

These compounds are useful for their various hormonic activities e.g. anti-uterotropic activity, lipid shifting activity, estrogenic activity, anti-estrogenic activity, myogenic activity, androgenic activity, anti-mammary growth activity, anti-implantational activity, antiinflammatory activity, and the like. For example, $2\alpha,3\alpha$-epithio-$5\alpha$-androstane-$6\beta,17\beta$-diol shows strong anti-uterotropic and lipid shifting activities when administered to a rat; $2\alpha,3\alpha$-epithio-$5\alpha$-androstane-$7\alpha,17\beta$-diol shows a 257 percent increase of value of vaginal TTC reduction at a dose of 3 mg per mouse, and a 64 percent inhibition of estrogenic response when tested by the vaginal TTC reduction method at a dose of 0.3 mg per mouse, which value is larger than that of $2\alpha,3\alpha$-epithio-$5\alpha$-androstan-$17\beta$-ol; $2\alpha,3\alpha$-epithio-$5\alpha$-androst-$9(11)$-ene-$17\beta$-ol shows 1.7 times myogenic activity and 0.4–0.5 times androgenic activity than testosterone propionate at a dose of 0.5–2.0 mg per rat, 63 percent inhibition of mammary growth at a dose of 0.05 mg per mouse, 65 percent inhibition of effect of estradiol when tested by a vaginal TTC reduction method at a dose of 0.03 mg per mouse, 100 percent delay or inhibition of implantation at a dose of 1.5 mg per rat, and 305 percent of estrogenic effect at a dose of 3 mg per mouse; $2\alpha,3\alpha$-epithio-$17\alpha$-hydroxy-$5\alpha$-pregnane-$11,20$-dione acetate showed 19 percent reduction of volume of exudation at a dose of 1 mg per rat. These effects show that the compounds are useful as medicaments for treatment of various disorders, insufficiencies or control of physiological functions in warm blooded animals for human, veterinary or poultry purposes at a dosage of 0.001–500 mg per kilogram of body weight. These compounds are suitable for enteral or parenteral administration in various conventional forms of liquid or solid preparations as a mixture of the effective doses of the compounds and as a pharmaceutically acceptable carrier.

The following examples are given to show the embodiment of the present invention but are not intended to limit the scope thereof. Abbreviations are those of conventional meanings.

EXAMPLE 1

1. To a solution of 528 mg of chlorine in 50 ml of glacial acetic acid is added 800 mg of potassium thiocyanate, and the mixture is stirred at room temperature for 20 minutes. To the solution is added a solution of 200 mg of 5α-androst-2-en-17β-ol in 15 ml of glacial acetic acid, and the mixture is stirred at room temperature for 1 hour 40 minutes. The reaction mixture is poured onto iced water and extracted with methylene chloride. The extract solution is washed with water, 10 percent aqueous solution of sodium carbonate and water, respectively, dried over anhydrous sodium sulfate and evaporated to dryness. Separation of 285 mg of the residue by thin-layer chromatography over silica gel gives 133 mg of 2β-chloro-3α-thiocyanato-5α-androstan-17β-ol (m.p. 106°–108° C. Yield: 49.6 percent.[α]$_D^{22}$ +45.3 ± 0.8° (c = 1.007, chloroform)) from the fraction of higher Rf value, 27 mg of 3β-chloro-2α-thiocyanato-5α-androstan-17β-ol(IR: $\nu_{max.}^{CHCl_3}$ 3586, 2170 cm$^{-1}$. Yield: 10.06 percent from the fraction of median Rf value and 23 mg of 2β-acetyloxy-3α-thiocyanato-5α-androstan-17β-ol (Yield: 8.42 percent. IR: $\nu_{max.}^{CHCl_3}$ 3586, 2170, 1740 cm$^{-1}$) from the fraction of lower Rf value.

2. To a solution of 248 mg of 2β-chloro-3α-thiocyanato-5α-androstan-17β-ol in a mixture of 2.5 ml of dioxane and 2.5 ml of methanol is added 250 mg of potassium carbonate in 1 ml of water, and the mixture is stirred at room temperature for 5.5 hours. The reaction mixture is diluted with water, and the separated crystals are washed with water. The crystals are dissolved in methylene chloride, washed with water, dried over anhydrous sodium sulfate and evaporated to dryness. Separation of 207 mg of the residue by thin-layer chromatography gives 153 mg of 2α,3α-epithio-5α-androstan-17β-ol and 22 mg of 5α-androst-2-en-17β-ol.

3. To a solution of 44 mg of 3β-chloro-2α-thiocyanato-5α-androstan-17β-ol in a mixture of 0.5 ml of dioxane and 0.5 ml of methanol is added a solution of 50 mg of potassium carbonate in 0.2 ml of water, and the mixture is stirred at room temperature for 48 hours 20 minutes. The reactiOn mixture is diluted with water, and extracted with methylene chloride. The extract solution is washed with water, dried over anhydrous sodium sulfate and evaporated to dryness. Separation of 39 mg of the residue by thin-layer chromatography over silica gel affords 2.5 mg of 5α-androst-2-en-27β-ol and 14 mg of 2α,3α-epithio-5α-androstan-17β-ol accompanied with 4 mg of the starting material.

4. To a solution of 23 mg of 2β-acetyloxy-3α-thiocyanato-5α-androstan-17β-ol in a mixture of 0.5 ml of dioxane and 0.5 ml of methanol is added a solution of 50 mg of potassium carbonate in 0.2 ml of water, and the mixture is stirred at room temperature for 3 hours. The reaction mixture is diluted with water and extracted with methylene chloride. The extract solution is washed with water, dried over anhydrous sodium sulfate and evaporated to dryness. Purification of 19 mg of the residue by thin-layer chromatography affords 12.5 mg of 2α,3α-epithio-5α-androstan-17β-ol.

EXAMPLE 2

To a solution of 1.4 g of chlorine in 50 ml of chloroform is added 2.4 g of dirhodane in 100 ml of chloroform, and the mixture is stirred at room temperature for 30 minutes. To the solution is added 2.88 g of 17α-methyl-5α-androst-2-en-17β-ol in 10 ml of chloroform and the mixture is stirred at room temperature for 1 hour. The reaction mixture is washed with iced water, 10 percent aqueous solution of sodium carbonate and water, respectively, dried over sodium sulfate and evaporated to dryness under reduced pressure. To a solution of 3.32 g of the residue in a mixture of 30 ml of methanol and 30 ml of dioxane is added a solution of 1 g of potassium hydroxide in 5 ml of water, and the mixture is stirred for 10 hours at room temperature. The reaction mixture is diluted with water and extracted with methylene chloride. The extract solution is washed with water, dried over anhydrous sodium sulfate and evaporated to dryness under reduced pressure. Purification of 2.67 g of the residue by thin-layer chromatography over silica gel affords 2.4 g of 2α,3α-epithio-17α-methyl-5α-androstan-17β-ol, m.p. 168°–169° C. Yield: 75.0 percent.

EXAMPLE 3

According to a similar procedure to that of Example 2, 1α-methyl-5α-androst-2-en-17β-ol is reacted with thiocyanogen chloride in glacial acetic acid for 1 hour, Followed by treatment of the product with potassium hydroxide in a mixture of methanol and water for 1 hour to afford 2α,3α-epithio-1α-methyl-5α-androstan-17β-ol, m.p. 124°–126° C, in 73 percent yield; 7α-methyl-5α-androst-2-en-17β-ol is reacted with thiocyanogen chloride in glacial acetic acid for 1 hour, followed by treatment with sodium carbonate in a mixture of ethanol and dioxane to afford 2α,3α-epithio-7α-methyl-5α-androstan-17β-ol, m.p. 140°–143° C, in 67 percent yield.

EXAMPLE 4

To a solution of 1.917 g of chlorine in 150 ml of glacial acetic acid is added 3.0 g of potassium thiocyanate, and the mixture is stirred for 10 minutes at room temperature. To a solution is added a suspension of 724 mg of 7α,17β-dihydroxy-5α-androst-2-ene in 40 ml of glacial acetic acid, and the mixture is stirred at room temperature for 1 hour. The reaction mixture is poured onto iced water and extracted with methylene chloride. The extract solution is washed successively with water, 10 percent aqueous solution of sodium carbonate and water, dried over anhydrous sodium sulfate and evaporated to dryness under reduced pressure. To a solution of 929 mg of the residue in a mixture of 10 ml of dioxane and 10 ml of methanol is added 1 g of potassium carbonate in 4 ml of water, and the mixture is stirred at room temperature for 5 hours and kept at room temperature for 12 hours. The extract solution is washed with water, dried over anhydrous sodium sulfate and evaporated under reduced pressure to dryness. Purification of 797 mg of the residue by thin-layer chromatography over silica gel affords 548 mg of 2α,3α-epithio-5α-androstane-7α,17β-diol, m.p. 164°–166° C. [α]$_D^{23}$ −7.8 ± 0.5° (c = 0.994, chloroform). Yield: 68.0 percent.

EXAMPLE 5

According to a similar procedure to that of Example 4, 5α-androst-2-ene-6β,17β-diol is reacted with thiocyanogen chloride in chloroform for 0.5 hour, followed by treatment of the product with potassium carbonate in a mixture of dioxane and methanol for 15 hours to afford 2α,3α-epithio-5α-androstane-6β,17β-diol, m.p. 180°–182° C, in 70 percent yield; 5α-estr-2-en-17β-ol is reacted with thiocyanogen chloride in chloroform for 1 hour, followed by treatment of the product with potassium carbonate in a mixture of dioxane and ethanol for 5 hours to afford 2α,3α-epithio-5α-estran-17β-ol, m.p. 115°–117° C, in 76 percent yield; and 5α-androsta-2,9(11)-dien-17β-ol is reacted with thiocyanogen chloride in methylene chloride for 0.5 hour, followed by treatment of the product with potassium carbonate in a mixture of dioxane and methanol for 4 hours to afford 2α,3α-epithio-5α-androst-9(11)-en-17β-ol, m.p. 126°–128° C, in 40 percent yield (acetate, m.p. 137°–139° C).

EXAMPLE 6

1. To a solution of 1.94 g of chlorine in 170 ml of glacial acetic acid is added 3.0 g of potassium thiocyanate, and the mixture is stirred at room temperature for 10 minutes. To the solution is added 1.000 g of 17α-acetyloxy-11,20-dioxo-5α-pregn-2-ene as a suspension in 50 ml of glacial acetic acid and the mixture is stirred at room temperature for 1 hour. The reaction mixture is poured onto iced water and extracted with methylene chloride. The extract solution is washed successively with water, 10 percent aqueous solution of sodium carbonate and water, dried over anhydrous sodium sulfate and evaporated to dryness under reduced pressure. Separation of 1.473 g of the residue by thin-layer chromatography gives 677 mg of 2β-chloro-3α-thiocyanato-17α-acetyloxy-11,20-dioxo-5α-pregnane (m.p. 207°–209° C. $[\alpha]_D^{23} + 52.4 \pm 0.9°$ (c = 1.019, chloroform). IR: $\nu_{max}^{CHCl_3}$ 2143, 1738, 1710, 1246 cm$^{-1}$) from fraction of higher Rf value and 357 mg of 2β,17α-diacetyloxy-3α-thiocyanato-11,20-dioxo-5α-pregnane (m.p. 227°–230° C. $[\alpha]_D^{23} + 63.2 \pm 1.1°$ (c = 0.996, chloroform). IR: $\nu_{max}^{Nujol}$ 2144, 1731, 1700, 1263 cm$^{-1}$) from the fraction of lower Rf value.

2. To a solution of 318 mg of 2β-chloro-3α-thiocyanato-11,20-dioxo-17α-acetyloxy-5α-pregnane in a mixture of 5 ml of dioxane and 5 ml of methanol is added a solution of 300 mg of potassium carbonate in 2 ml of water, and the mixture is stirred for 4 hours at room temperature. The reaction mixture is diluted with iced water and extracted with methylene chloride. The extract solution is washed with water, dried over anhydrous sodium sulfate and evaporated to dryness under reduced pressure. Separation of the residue by thin-layer chromatography over silica gel affords 206 mg of 2α,3α-epithio-11,20-dioxo-17α-acetyloxy-5α-pregnane (m.p. 167°–169° C. $[\alpha]_D^{23} + 37.1 \pm 0.8°$ (c = 0.973, chloroform). IR: $\nu_{max}^{Nujol}$ 1732, 1709, 1245 cm$^{-1}$) from fraction of higher Rf value and 46 mg of 2α,3α-epithio-11,20-dioxo-17α-hydroxy-5α-pregnane (m.p. 183°–185° C. $[\alpha]_D^{23} + 39.3 \pm 0.8°$ (c = 0.971, chloroform). IR: $\nu_{max}^{Nujol}$ 3570, 3516, 1700 cm$^{-1}$) from fraction of lower Rf value, accompanied with 2-ene compound. 3. To a solution of 254 mg of 2β,17α-diacetyloxy-3α-thiocyanato-11,20-dioxo-5α-pregnane in a mixture of 5 ml of dioxane and 5 ml of methanol is added a solution of 300 mg of potassium carbonate in 2 ml of water, and the mixture is stirred at room temperature for 3.5 hours. The reaction mixture is diluted with iced water and extracted with methylene chloride. The extract solution is washed with water, dried over anhydrous sodium sulfate and evaporated to dryness under reduced pressure. Separation of the residue by thin-layer chromatography affords 105 mg of 2α,3α-epithio-17α-acetyloxy-11,20-dioxo-5α-pregnane, m.p. 167°–169° C, and 36 mg of 2α,3α-epithio-17α-hydroxy-11,20-dioxo-5α-pregnane, m.p. 183°–185° C.

EXAMPLE 7

To a solution of 1.5 g of chlorine in 80 ml of glacial acetic acid is added 2.5 g of potassium thiocyanate, and the mixture is stirred for 10 minutes at room temperature. To the solution is added a suspension of 1.50 g of 5α-pregn-2-ene-20-one in 20 ml of glacial acetic acid, and the mixture is stirred at room temperature for 1 hour. The reaction mixture is poured onto iced water and extracted with methylene chloride. The extract solution is washed with water, 10 percent aqueous solution of sodium carbonate and water, dried over anhydrous sodium sulfate and evaporated to dryness under reduced pressure. To a solution of 1.3 g of the residue in a mixture of 20 ml of dioxane and 20 ml of methanol is added 0.9 g of sodium carbonate in 4.5 ml of water and the mixture is stirred at room temperature for 6 hours. The reaction mixture is diluted with water and extracted with methylene chloride. The extract solution is washed with water, dried over anhydrous sodium sulfate and evaporated to dryness under reduced pressure. Purification of 1.21 g of the residue by thin-layer chromatography over silica gel and recrystallization from acetone and hexane affords 1.14 g of 2α,3α-epithio-5α-pregnan-20-one, m.p. 160°–162° C/193°B197° C. Yield: 69 percent.

EXAMPLE 8

According to a similar procedure to that of Example 7, 17α-acetyloxy-5α-pregn-2-en-20-one is reacted with thiocyanogen chloride in glacial acetic acid for 1 hour, followed by treatment of the product with potassium carbonate in a mixture of methanol and dioxane for 12 hours to afford 2α,3α-epithio-17α-acetyloxy-5α-pregnan-20-one, m.p. 169°–171° C, in 60 percent yield; 17α-hydroxy-21-acetyloxy- 5α-pregn-2-ene-11,20-dione is treated with thiocyanogen chloride in glacial acetic acid for 1.5 hours, followed by treatment of the product with sodium carbonate in a mixture of methanol and dioxane for 6 hours to afford 2α,3α-epithio-21-acetyloxy-17α-hydroxy-5α-pregnane-11,20-dione, m.p. 146°–147° C and 2α,3α-epithio-21,17α-dihydroxy-5α-pregnane-11,20-dione, m.p. 152°–154° C, in 73 percent yield.

What we claim is:

1. A process for preparation of 2α,3α-epithio-5α-steroid of the estrane, androstane or pregnane series which comprises reacting a Δ²-5α-steroid with a thiocyanogen halide, followed by treatment of the product with a basic medium.

2. A process claimed in claim 1, wherein the thiocyanogen halide is thiocyanogen chloride.

3. A process claimed in claim 1, wherein the thiocyanogen halide utilized is five to a hundred mole equivalents of thiocyanogen chloride.

4. A process claimed in claim 1, wherein the basic condition is obtained with an alkali metal carbonate or hydroxide.

* * * * *